United States Patent [19]

Sauerwald et al.

[11] 4,453,435

[45] Jun. 12, 1984

[54] TOOL SUPPORT

[75] Inventors: Walter Sauerwald, Dortmund; Bernd Weck, Gorxheimertal; Klaus Schmidts, Dortmund, all of Fed. Rep. of Germany

[73] Assignee: Hoesch Maschinenfabrik Deutschland AG, Dortmund, Fed. Rep. of Germany

[21] Appl. No.: 363,614

[22] Filed: Mar. 30, 1982

[30] Foreign Application Priority Data

Apr. 25, 1981 [DE] Fed. Rep. of Germany ... 8112300[U]

[51] Int. Cl.³ .............................................. B23B 4/06
[52] U.S. Cl. .......................................... 82/1.4; 74/826; 82/36 A

[58] Field of Search ...................... 74/826; 82/1.4, 25, 82/36 A

[56] References Cited

U.S. PATENT DOCUMENTS 2,230,509  2/1941  Lenarth ................................. 82/1.4
2,547,915  4/1951  Leonard ............................... 82/1.4

Primary Examiner—W. D. Bray
Attorney, Agent, or Firm—Max Fogiel

[57] ABSTRACT

A tool support for turning annular grooves of inwardly increasing cross-section in workpieces, has a carrier, a tool clamping rod rotatably and axially shiftable in the carrier, and machining tools carried by the rod and having an effective length which is shorter than the cross-sectional opening of the groove at the workpiece surface.

17 Claims, 4 Drawing Figures

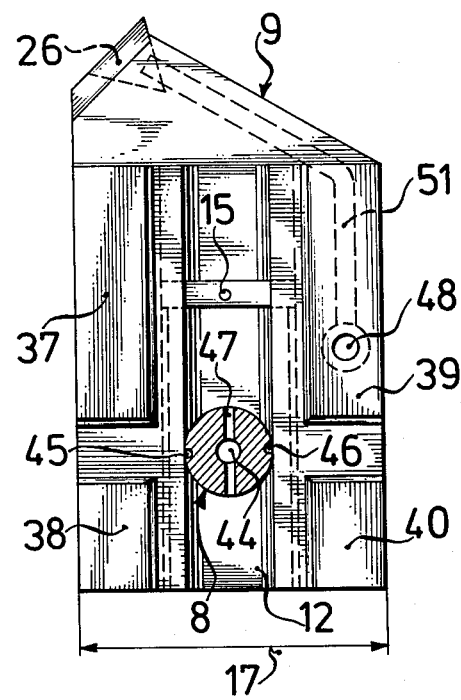
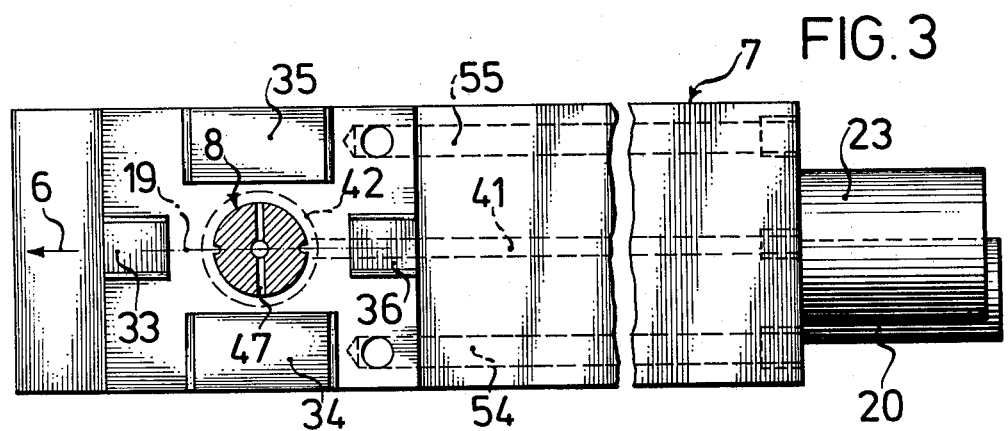

TOOL SUPPORT

BACKGROUND OF THE INVENTION

The present invention relates to a tool support.

More particularly, the invention relates to a tool support for tools used in making articles that are turned.

Still more specifically, the invention relates to a support for use in the turning of deep annular grooves.

A support of this general type is already known from German Pat. No. 977,349 and is, by and large, satisfactory for performing its intended functions. One problem occurs, however, when such a support is employed in machining the sidewalls of annular grooves whose cross-section increases in inward direction: the turning tools must be changed and this requires a relatively large time loss. This time loss is especially disadvantageous in relation to the overall turning time if, as is often the case, the turning tools can be exchanged only within the confines of the annular groove, since this is difficult and hence even more time consuming.

SUMMARY OF THE INVENTION

Accordingly, it is an object of the invention to overcome the disadvantages of the prior art.

A more particular object is to provide an improved tool support which is not subject to those disadvantages.

Still more specifically, it is an object of the present invention to provide an improved tool support for exchangeable turning tools, in which the tools can be readily exchanged both in normal and overhead position.

Pursuant to these objects and still others which will become apparent hereafter, one aspect of the invention resides in a tool support for providing workpieces with annular grooves having an inwardly increasing cross-section, comprising a tool carrier; a turnable and axially shiftable tool clamping rod on the carrier; and a machining tool means secured by the rod for machining opposite side faces of an annular groove, the machining tool means having a length which is shorter than the cross-section opening of the annular groove at the workpiece surface.

The invention will hereafter be described with reference to an exemplary embodiment, as illustrated in the appended drawing. It is to be understood that nothing in this description is intended to have any limiting effect, and that the definitive statement of the inventive contribution to the art is to be found only in the appended claims.

BRIEF DESCRIPTION OF THE DRAWING

FIG. 2 is a section taken on line II—II of FIG. 1;

FIG. 3 is a section taken on line III—III of FIG. 1; and

DESCRIPTION OF PREFERRED EMBODIMENTS

Figure 1:
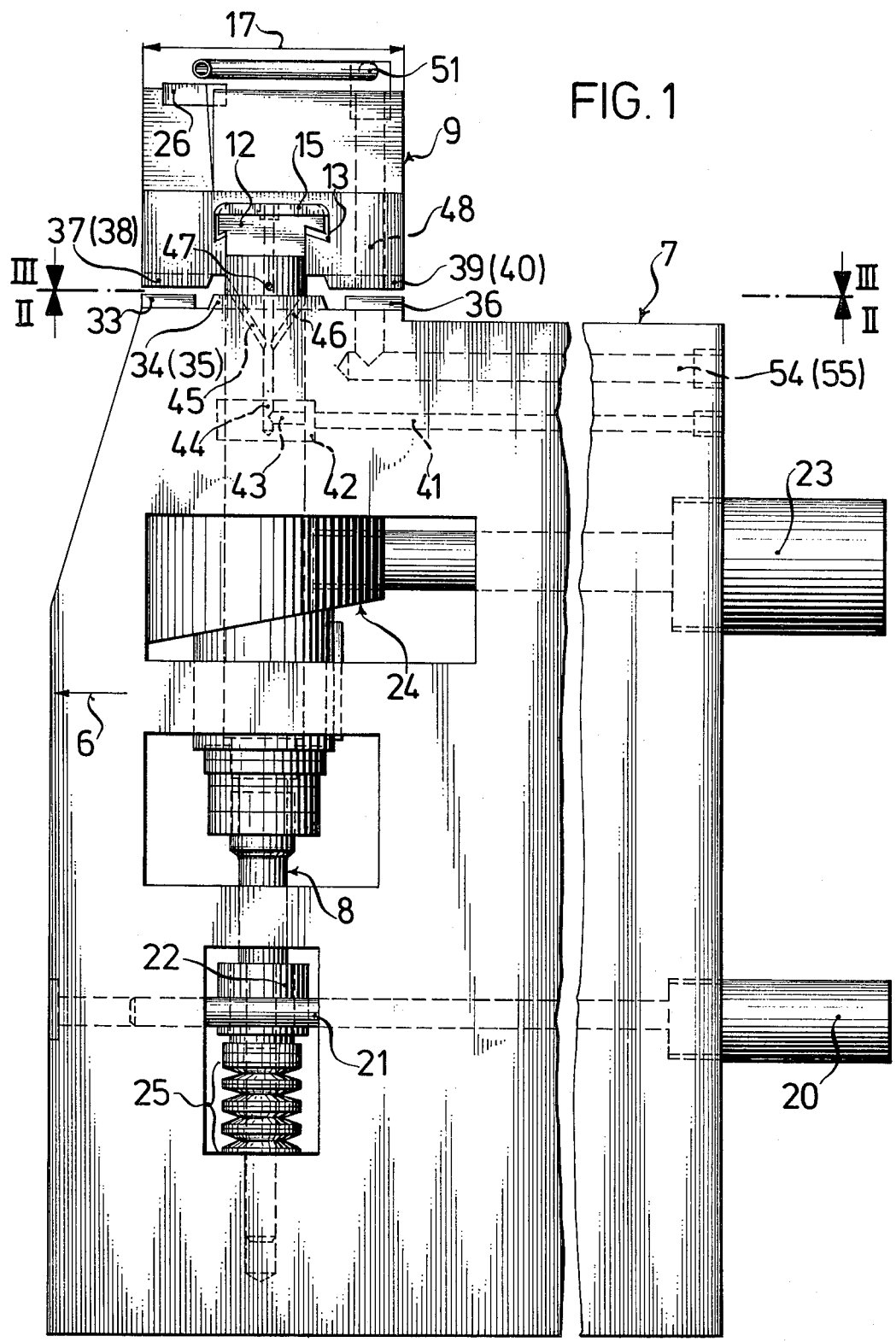
FIG. 1 is a perspective view, illustrating a support according to the invention.

An exemplary embodiment of the invention is illustrated in FIGS. 1-4, where a workpiece 1 is shown to have an already machined annular groove 2. It is to be noted that the cross-section of groove 2 is greater at its interior than at the workpiece surface 3. This groove 2 is to be further machined (turned) until it receives the contour indicated by the dot-dash line shown in FIG. 4. The axis of rotation of the workpiece 1 during this turning is identified by the dot-dash line 5.

The support itself has a housing (not illustrated) in which a tool carrier 7 is mounted in such a manner that it can be adjusted both as to height and in feed direction 6. Carrier 7 has a turnable and shiftable tool clamping rod 8 for pivoting and clamping of the turning tools 9, 10 and can be used both in normal and overhead position for machining the groove 2. It should be noted that carrier 7 is narrower than the width 11 of groove 2 at the workpiece surface 3. Rod 8 has a T-shaped clamping head 12; each tool 9, 10 has a matingly configurated recess 13, 14 in which the head 12 is receivable. The depth of insertion is determined by an abutment 15, 16 which is threaded onto the head 12.

Figure 4:
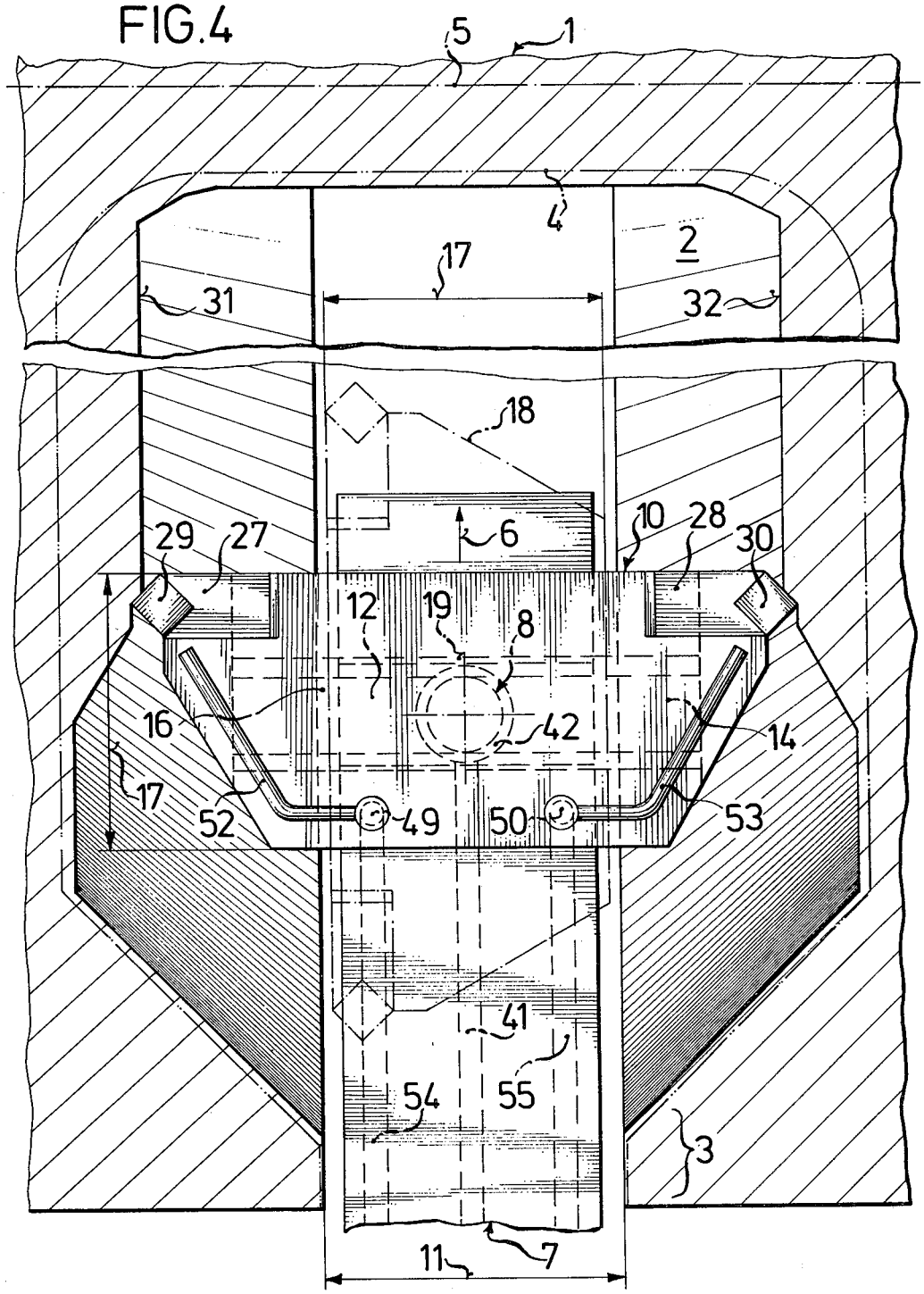
FIG. 4 is a fragmentary section, showing a workpiece and the front part of the support from FIGS. 1-3.

The tools 9, 10 both have an identical length 17 which is smaller than the aforementioned dimension 11 (see also FIG. 4 where length 17 is entered on the mounting position 18 of tool 10).

In the illustrated embodiment, provision is made for journalling the rod 8 vertically, at the mid-portion 19 of the carrier 7. Pivoting of the tools 9, 10 on head 12 produces a displacement in direction 20 by a rack 21 and a pinion 22 which is connected with rod 8. A wedge clamping arrangement 24, subject to axial stressing by a set of dished springs 25, clamps the tools 9, 10 in place and is powered by a shifting device (drive) 23.

As FIG. 2 shows best, the tool 9 has a (hard-metal) cutting edge 26, whereas tool 10 has two short tool sections 27, 28 (FIG. 4) having cutting edges 29, 30 which permit simultaneous machining of both lateral surfaces 31, 32 of the annular groove 2. The cutting edges 29, 30 are arranged symmetrically with reference to the mid-portion 19 of carrier 7, but this is purely optional. Carrier 7 and tools 9, 10 together constitute a unit in form of a claw-type coupling, with each half of the unit having four claws which are set off through 90° angles, namely the claws 33, 34, 35, 36 in one half and the claws 37, 38, 39 and 40 in the other half. The claws have trapezoidal cross-section. Of course, other solutions are also possible; for example, carrier 7 and tools 9, 10 could constitute a unit forming a coupling with Hirth-type toothing.

In use of the device, the claws 33-40 are cleaned with a flushing agent before the tools 9, 10 are clamped in place. Any suitable agent may be used, although compressed air is currently preferred which is admitted via a bore 41 and an annular recess 42 into the bores 43, 44, 45, 46 and 47 of rod 8. After the tools are clamped in place, each cutting edge 26, 29 and 30 is supplied with a cutting and cooling agent (known per se) via a respective bore 48, 49 and 50 (in tools 9, 10) and conduits 51, 52, and 53, and passages 54, 55 in the carrier 7.

While the invention has been described with reference to a specific illustrated embodiment, it should be noted that this was done for purposes of explanation only and that any and all modifications which are possible are intended to be encompssed within the ambit of the appended claims.

We claim:

1. Tool support for a turning machine particularly for turning workpieces with substantially deep annular grooves, annular grooves having an inwardly increasing cross-section, comprising: a tool carrier; a turnably and axially shiftable tool clamping rod on said carrier;

and a machining tool means secured by said rod for machining opposite side faces of an annular groove, said rod having a pivoting axis substantially perpendicular to longitudinal feed direction of said machine.

2. Tool support as defined in claim 1, and further comprising means mounting said rod for rotation and shifting on an upright axis.

3. Tool support as defined in claim 2, and an abutment of said tool means.

4. Tool support as defined in claim 1, said rod having a T-shaped clamping head for releasably securing said tool means.

5. Tool support as defined in claim 1, and further comprising means centrally journalling said rod in said carrier.

6. Tool support as defined in claim 1, and further comprising a shifting device coupled with said rod to effect movement thereof, including a pinion cooperating with said rod and a rack meshing with said pinion.

7. Tool support as defined in claim 1, said rod having a clamping device for said tool means, including a wedge unit and a drive for operating said unit to move it between a clamping and an unclamping position.

8. Tool support as defined in claim 1, said tool means having two cutting edges, one each for a respective side face of a groove to be machined.

9. Tool support as defined in claim 8, wherein said cutting edges are arranged symmetrically with reference to the center of said carrier.

10. Tool support as defined in claim 8, said tool means having two relatively short tool sections provided with cutting edges.

11. Tool support as defined in claim 1, said carrier and tool means together constituting a unit forming a claw-type coupling.

12. Tool support as defined in claim 11, said carrier and tool means each having four claws of trapezoidal cross-section which are offset through respective 90° angles.

13. Tool support as defined in claim 1, said carrier and tool means together constituting a unit forming a Hirth-type coupling.

14. Tool support as defined in claim 1, said rod having passages for admittance of a flushing agent to said tool means.

15. Tool support as defined in claim 14, said carrier having a bore and a communicating annular recess for said flushing agent, in communication with said passages of said rod.

16. Tool support as defined in claim 15, said tool means including at least two cutting edges and having for each such edge a flushing-agent bore and a tubular connector communicating with said bore.

17. Tool support as defined in claim 16, said carrier having an interior provided with a pair of conduits for supply of a cutting and cooling agent to said tool means.

* * * * *